Aug. 5, 1952 J. RATTI 2,605,799
BAND SAW TYPE LOAF CUTTING MACHINE
Filed Aug. 17, 1949 3 Sheets-Sheet 1

Inventor
Jacques Ratti

Aug. 5, 1952  J. RATTI  2,605,799
BAND SAW TYPE LOAF CUTTING MACHINE
Filed Aug. 17, 1949  3 Sheets-Sheet 2
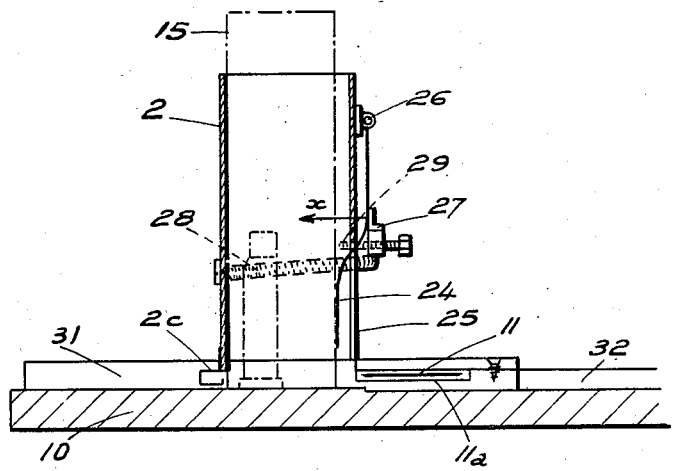
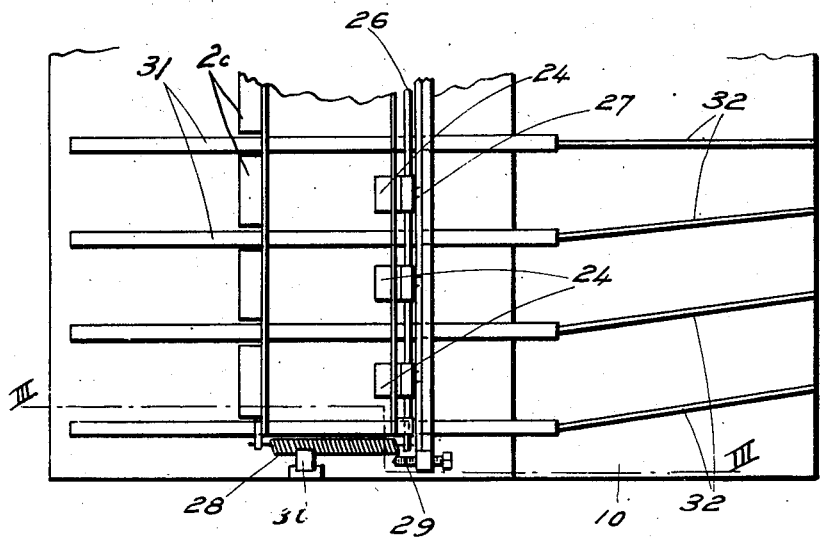

Patented Aug. 5, 1952

2,605,799

UNITED STATES PATENT OFFICE 2,605,799

BAND-SAW TYPE LOAF CUTTING MACHINE

Jacques Ratti, Levallois-Perret, France

Application August 17, 1949, Serial No. 110,767
In France September 3, 1948

2 Claims. (Cl. 146—88)

This invention generally relates to automatic slicing machines of the type used in cutting loaves of bread and the like into slices of equal thickness in the production of biscuits or rusks.

It is an object of the invention to provide an improved automatic slicing machine with which it is possible to obtain automatically a high output of simultaneously cut slices and direct said slices in alignment over a receiving surface such as a conveyor of a continuous baking oven.

Another object is to provide such an automatic slicing machine which is adapted to feed a plurality of simultaneously cut slices in alignment onto a receiving surface such as a continuously-fed baking oven conveyor in such a manner as to occupy the entire useful surface or width of said conveyor.

Another object is to provide such a machine which is simple and economical to construct and operate, which is rugged and which is automatically adjustable to take care of any such slight variation in cross-sectional dimensions and configuration of the products, or loaves, to be sliced, as may generally be found to occur in practice.

Other objects and advantages of the invention will appear as the description proceeds.

With those objects in view my invention essentially consists of a flat supporting means or table, a cage mounted over said table for horizontal reciprocatory traverse with respect thereto, the amplitude of the reciprocation of the cage being somewhat greater than the length dimension of each slice to be cut, a plurality of vertical transversely-aligned cavities or sockets in said cage each adapted to receive therein a loaf or the like to be sliced, a cutting element such as a band-saw arranged above and across the table at a vertical spacing therefrom substantially equal to or slightly greater than the desired thickness dimension for each slice and so arranged that said cage will pass completely over said saw in each of its traversing movements, and presser means associated with each said socket to firmly yieldingly press the loaf therein in position during the active stroke of said cage, and means releasing all of said pressure arms from the related loaves toward the end of each return stroke of the cage to allow said loaves to drop by their own weight into contact with said table so as to allow a fresh slice to be cut therefrom at the next following useful traversing stroke of the cage. At each active traverse of the cage assembly, the freshly cut slices will push forward the corresponding slices cut off at the preceding active traverse or stroke, and all of said slices may thus be directed through suitable guide means in transverse alignment onto a receiving surface such as a baking oven conveyor so as to substantially completely cover the useful surface of said conveyor.

The invention will now be described with greater detail in connection with one specific embodiment thereof, given by way of illustration and not of limitation, and represented in the accompanying drawings, wherein:

Fig. 3 is a sectional side elevation on an enlarged scale showing the construction of an individual gravity-feed socket with some associated parts; and Fig. 4 is a corresponding view in plan.

Figure 1:
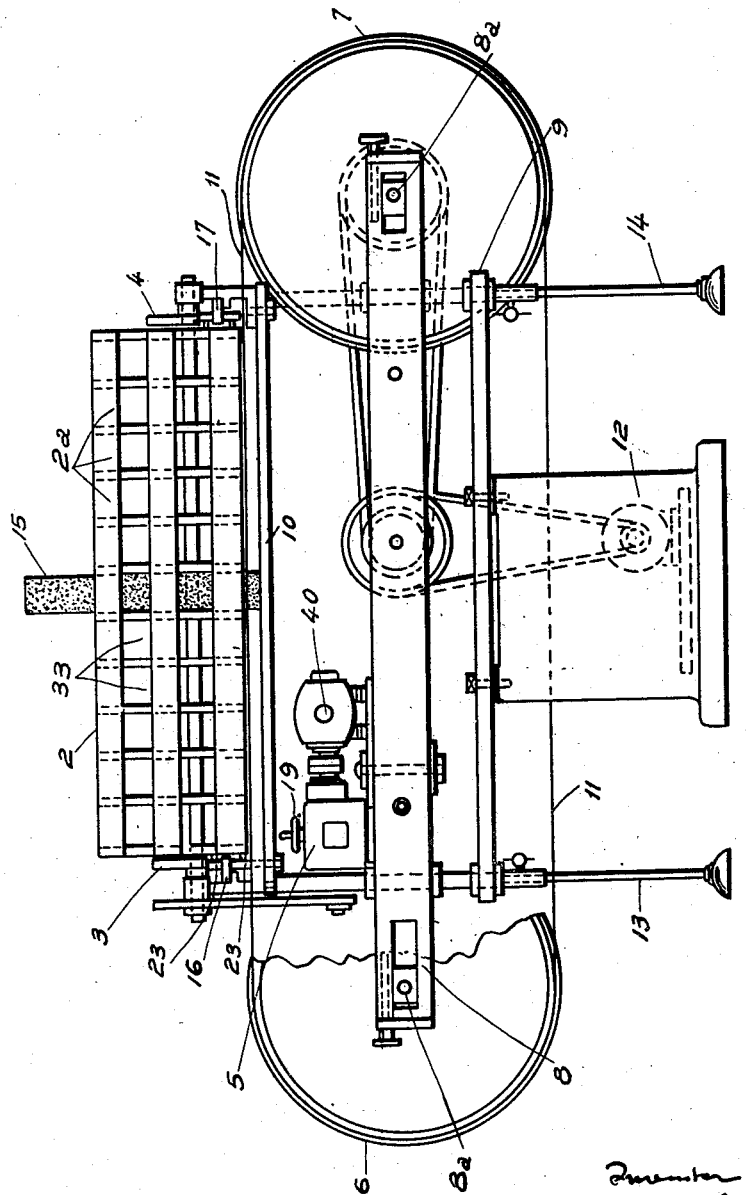
Fig. 1 is a front elevation of the machine.
Figure 2:
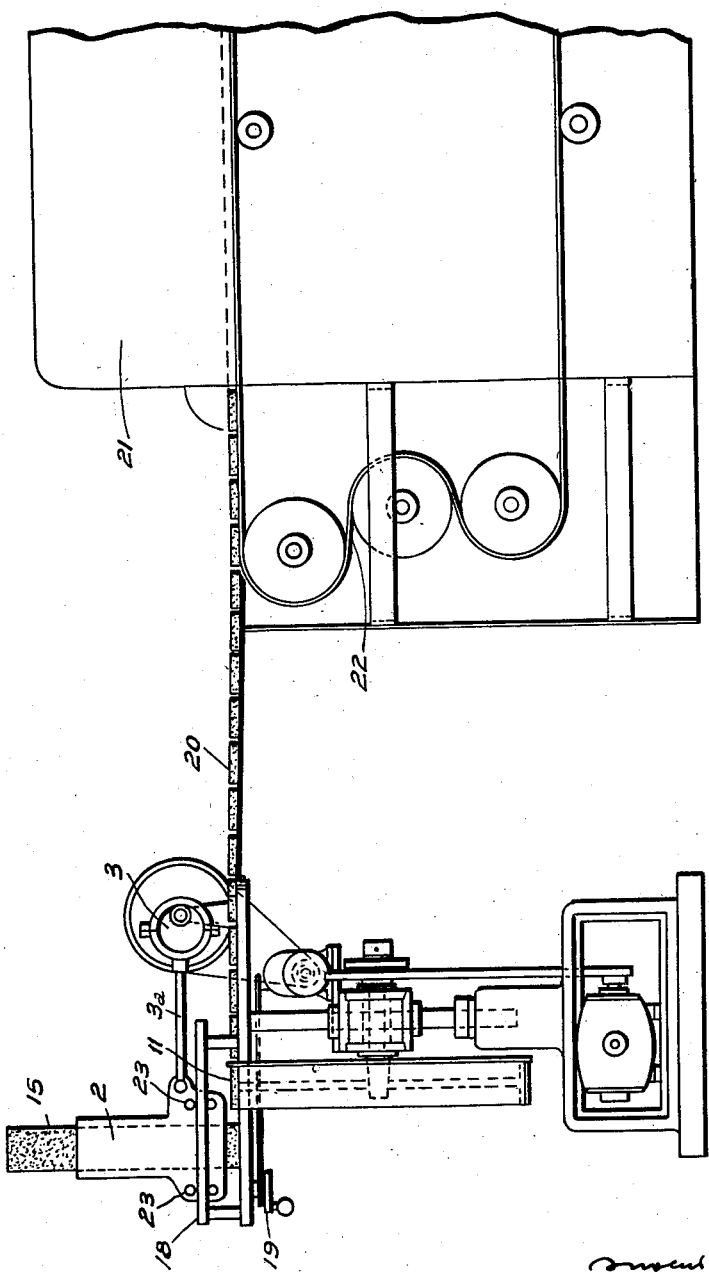
Fig. 2 is a corresponding side view thereof.

While the exemplary embodiment about to be described, relates to a machine used in connection with the production of rusks from loaves of bread, it is to be understood that the invention may be readily applied to other fields and that a variety of other products, especially other food products, may be cut into slices by means of a machine built according to the invention.

As shown the machine comprises a table 10 over which is a reciprocatory cage 2 provided with a transverse row of vertical sockets 2a therein each of which is adapted to receive an individual loaf 15 to be sliced. The cage 2 is driven as shown herein from a pair of cranks or eccenters 3, 4 through connecting rods 3a, 4a, and is guided in its reciprocation by means of the side rails 16, 17 with the interposal of rollers or the like 23. The crank-discs or eccenters 3, 4 are driven in any suitable manner, for instance as shown by means of belt transmission from an electric motor assembly diagrammatically indicated at 40 beneath the table 10 through a speed-box 5.

A band saw 11 is trained about the drums 6, 7 adapted to be driven at high speed from a motor housed in the machine base 12. The upper flight of the saw band 11 is arranged to pass across and above the table 10 at a suitable position to perform its slicing action on each active stroke of the cage 2. The band-saw used preferably has a width but slightly less than the longitudinal dimension of the loaves to be sliced. The vertical spacing of the saw band 11 above the surface of table 2 defines the thickness of the slices to be cut.

It will be seen that, assuming the loaves are each freely slidable in their respective sockets, they will be caused to drop under their own gravity into contact with the table 10 upon the cage having reached the rear end of its return stroke. During the forward stroke or active traverse of the cage, the loaves will all be presented against the cutting edge of the saw band 11 so that a slice is cut off each loaf. As the cage reaches the forward end of its active traverse the loaves rest with their bottom ends upon the saw blade; when the cage draws back the loaves drop down upon the table; and the cycle is repeated. Each time the loaves move forward at the active traverse of the cage, they push before them the slices cut off at the preceding stroke and the slices are so thus successively directed toward the endless conveyor 22 of the baking oven 21 by guide means to be described later.

To prevent that the loaves, at the start of the return movement of the cage, should exert frictional adhesion upon the slices just cut off from them which would tend to draw said slices backward and thus impede proper operation of the machine, there is provided at the bottom and the rear of the cage 2, as shown particularly in Fig. 3, an appendage 2c having a backwardly directed portion and a downwardly and forwardly directed flange, as shown. This flange is adapted, after the slice has been cut off at the forward end of the active traverse, to project into the gap between the saw blade 11 and the top of the table a small distance to the front of the rear active edge of the saw blade, so as to push the freshly cut-off slice a slight distance forward, and thus prevent any danger of it being drawn back through frictional contact with the edge of the remaining loaf.

Moreover, the surface of the table is formed, below the saw, with a slight downward step as shown in Fig. 3, to reduce the friction between the bottom end of the loaf and the table while the slice is being cut therefrom.

In the description as so far set forth it has been assumed that the loaves were freely movable in their sockets. Actually, however, while the loaves should be free to drop down under their own weight as the cage has reached its rearward position to permit of a fresh slice being cut from them, it is essential on the other hand that the loaves be firmly maintained in position in their respective sockets during the active traverse of the cage to ensure that a smooth slice-cutting operation is accomplished by the saw. It is necessary moreover that the above conditions be fulfilled regardless of the precise shape and size, in cross-section, of the individual loaves charged into the sockets, and which may vary somewhat as from one loaf to another.

To accomplish the above-defined conditions I provide according to my invention the following means: Openings 25 are formed in the front wall of each socket 2a. Presser-arms, such as suitably bent spring-plates 24 (see Figs. 3 and 4) are each secured at their upper end on a common pivot rod 26 rotatable in suitable end-bearings (not shown) mounted at the sides of the cage. The presser arms 24 have an inbent lower portion as shown in Fig. 3 which projects into the related socket 2a through the apertures 25, into engagement with the front side of the loaf 15 in the socket. All of the spring-arms 24 are moreover interconnected by a horizontal cross-bar 27 which is at all times urged in the direction of the arrow x in Fig. 3 by suitable spring means such as the tension springs 28, so as to tend to apply the spring presser arms 25 yieldably against the surface of the loaves. The resiliency of each spring presser arm 24 is such as to take up any unavoidable variations in shape and dimensions of the various loaves contained in the respective sockets 2a, and firmly press all the loaves against the back wall of its socket. To release the loaves as the cage approaches the rear end of its return stroke and allow the loaves to drop down freely onto the table, I provide the cross-bar 27 with adjustable stops 29 at its ends and cooperating fixed stops 30 on the machine table. These cooperating stop means are so arranged and set as to cause the entire pivotal presser assembly including cross-bar 27 and presser arms 25 to be swung back as the cage reaches a predetermined point near the rearmost end of its return stroke, so that the presser arms 25 are retracted from their clamping engagement with the loaves and the latter then become free to drop by gravity effect.

Parallel guides 31 (see Figs. 3 and 4) are disposed on the table to extend in a direction parallel with that of the traverse of the cage and the guides 31 are each located vertically beneath a corresponding one of the separations between the sockets 2a. The guides 31 serve to guide the lower ends of the loaves 15 in their traversing movement over the table, and they are made to extend some distance beyond the saw-band 11a as shown so as also to guide the cut slices in their movement as they are being pushed from beneath the saw by the advancing loaves. Apertures or slots 11a are formed in the guides 31 to allow the band saw 11 to pass therethrough. The guides 31 are extended by further guide members 32 which direct the files of cut slices onto the table or conveyor of the baking oven. As shown in Fig. 4, these guide members 32 extend in converging relationship so as to conform with the width of the baking oven conveyor used.

Inspection openings or windows 33 are preferably formed in the rear wall of each socket 2a so as to allow supervision of the proper downward feeding motion of the loaves and ascertain the time when it becomes necessary to insert new loaves into the sockets.

The vertical spacing of the saw band 11 above the table 10 is made adjustable to allow of varying the thickness of the slices produced.

The motor driving the drums 6, 7 of the band-saw is housed in the base 12 of the machine. As more particularly shown in Fig. 1, the machine rests at its sides upon telescopable legs comprising rods 13, 14 slidably adjustable in height by means of set-screws, so as to adjust the effective vertical position of the machine with regard to the particular height of the conveyor of the baking oven. Said side legs of the machine are interconnected by cross-bars 9. The drums of the band-saw are journalled in bearings 8a mounted for horizontal sliding adjustment in a longitudinal member 8 to allow of adjusting the tension of the band-saw according to requirements.

In view of the fact that the rate of feed of the endless conveyor 22 of the baking oven 21 is variable depending on the temperature in the oven, I may preferably provide in connection with my machine a speed variator or change-speed gear of any suitable description indicated at 5 at the output from the cage-driving motor 40. The provision of such change speed means makes it possible to supply the slices in each instance at a predetermined rate of output such that the files of slices or rusks will be substantialy uninterrupted longitudinally of the oven conveyor. The speed variator 5 is controlled by means of a handwheel 19.

It is to be understood that my invention is no way restricted to the details described and illustrated in connection with the illustrative embodiment selected herein, and that it may be embodied in many other ways within the purview of the ensuing claims.

What I claim is:

1. An automatic slicing machine comprising, in combination, a machine table; a band-saw stretched across said table at a predetermined height thereabove; a reciprocatory cage with a transverse row of vertical sockets formed therein for receiving loaves to be sliced; means to reciprocate said cage above said saw with an amplitude of stroke substantially greater than the longitudinal dimension of the slice to be cut; automatically releasable spring pressure means adapted to yieldingly press each loaf against the rear wall of its socket during the forward stroke of said cage and to release said loaves toward the end of the return stroke of said cage to allow said loaves to drop down on said table under the force of gravity in readiness for the cutting of a fresh slice; a parallel set of longitudinal guides on said table arranged vertically beneath a separation between adjacent sockets and extending forwardly beyond the forward edge of said band-saw; and slots formed in said guides to allow said band-saw to pass therethrough.

2. An automatic slicing machine comprising, in combination, a machine table having one portion at a slightly lower level than another portion thereof; a band-saw stretched across said table at a predetermined height thereabove and over the line where said one portion of said table joins the other portion thereof; means for moving said band-saw aross said table; a cage formed with at least one vertical socket therein for receiving a loaf to be sliced, said cage having a rear wall located distant from said band-saw; means for reciprocating said cage above said saw in a direction transverse to the movement thereof and with an amplitude of stroke substantially greater than the longitudinal dimension of the slice to be cut; flange means connected to a lower portion of said rear wall of said cage and located immediately above said machine table at a height less than the height of said band-saw above said table, whereby said flange extends beneath said band-saw at the end of the forward stroke of said cage toward said band-saw so as to positively separate the slice cut by said band-saw from the portion of the loaf remaining in said socket; and a pair of guides arranged beneath said cage and band-saw on said table and extending beyond said band-saw on the side thereof distant from said cage, said guides serving to guide the slices cut from said loaf in said socket and said flange causing a slice cut from said loaf to push a previously cut slice along said guides, said guides being formed with slots to provide space for said band-saw.

JACQUES RATTI.

REFERENCES CITED

The following references are of record in the file of this patent:

UNITED STATES PATENTS

| Number | Name | Date |
|---|---|---|
| 191,375 | Schmitt | May 29, 1877 |
| 265,799 | Hall | Oct. 10, 1882 |
| 1,086,248 | Varian | Feb. 3, 1914 |
| 1,292,160 | Unruch | Jan. 21, 1919 |
| 1,420,235 | Bjorlin | June 20, 1922 |
| 1,479,469 | Kirnbauer | Jan. 1, 1924 |
| 1,665,888 | Litty | Apr. 10, 1928 |
| 2,430,504 | Grills | Nov. 11, 1947 |

FOREIGN PATENTS

| Number | Country | Date |
|---|---|---|
| 23,123 | Great Britain | 1908 |
| 7,270 | Great Britain | Mar. 23, 1914 |
| 222,727 | Great Britain | Oct. 4, 1924 |
| 441,634 | Germany | Mar. 5, 1927 |
| 446,245 | Germany | June 27, 1927 |
| 440,730 | Great Britain | Dec. 27, 1935 |